United States Patent [19]

Crankshaw

[11] 4,385,429
[45] May 31, 1983

[54] METHOD OF MANUFACTURING A CLUTCH PLATE

[75] Inventor: John H. Crankshaw, Erie, Pa.

[73] Assignee: Dynetics, Inc., Erie, Pa.

[21] Appl. No.: 259,034

[22] Filed: Apr. 30, 1981

Related U.S. Application Data

[62] Division of Ser. No. 58,516, Jul. 18, 1979, abandoned.

[51] Int. Cl.³ .............................................. B23P 19/00
[52] U.S. Cl. ........................................ 29/434; 29/469; 72/103; 72/703; 192/107 R
[58] Field of Search ............... 29/434, 469; 72/103, 72/365, 123, 102, 703, 124; 192/70.2, 70.12, 107 R, 113

[56] References Cited

U.S. PATENT DOCUMENTS

| | | | |
|---|---|---|---|
| 2,308,432 | 1/1943 | Johnson | 72/703 X |
| 2,533,480 | 12/1950 | Leininger et al. | 192/107 R |
| 2,690,248 | 9/1954 | McDowall | 192/107 R X |
| 3,063,531 | 11/1962 | Aschauer | 192/107 R |
| 3,295,640 | 1/1967 | Beuchle | 192/113 A |
| 3,302,436 | 2/1967 | Jacobs | 72/365 X |
| 3,614,826 | 10/1971 | Pilao | 72/365 X |
| 3,695,407 | 10/1972 | Peery | 192/113 B |
| 3,704,612 | 12/1972 | Loos | 72/102 |
| 4,010,831 | 3/1977 | Reuter | 192/70.2 |
| 4,027,758 | 6/1977 | Gustavsson et al. | 192/113 B |
| 4,113,067 | 9/1978 | Coons et al. | 188/71.60 |

Primary Examiner—Charlie T. Moon
Attorney, Agent, or Firm—Charles L. Lovercheck; Wayne L. Lovercheck; Dale R. Lovercheck

[57] ABSTRACT

A clutch is disclosed having an input shaft and an output shaft and having alternate pairs of discs interfitting with each other. Half of the discs being attached to the input shaft and half to the output shaft. The discs are knurled on one side in a grooved pattern. The knurling is deeper at the inner radius than at the outer radius so that there is a major restriction to oil flow from the inner radius to the outer radius. The restriction of the grooves insures that the grooves are completely filled with oil during operation of the clutch.

3 Claims, 10 Drawing Figures

METHOD OF MANUFACTURING A CLUTCH PLATE

This is a division of application Ser. No. 58,516 filed July 18, 1979 now abandoned.

REFERENCE TO PRIOR ART

U.S. Pat. No. 4,009,771 discloses a Slip Friction Clutch and U.S. Pat. No. 4,047,642 discloses a Synchronizing Coupling utilizing friction discs. U.S. Pat. No. 2,690,248 shows a clutch with discs that have grooves of uniform depth. U.S. Pat. No. 3,073,424 shows a clutch with discs having intersecting grooves. U.S. Pat. No. 1,898,978 shows a clutch plate with radial grooves that are deeper at their outer end. U.S. Pat. No. 2,516,544 shows a clutch plate with grooves that are closed at their outer ends. None of these patents show clutch plates having grooves restricted at their outer ends.

OBJECTS OF THE INVENTION

It is an object of the invention to provide an improved disc for a friction clutch.

Another object of the invention is to provide an improved friction clutch.

Another object of the invention is to provide a friction clutch wherein the clutch plates are virtually identical.

Another object of the invention is to provide a friction clutch that is simple in construction, economical to manufacture and simple and efficient to use.

Another object of the invention is to provide an improved cooling arrangement for discs on a friction clutch.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BACKGROUND OF THE INVENTION

The basic problem of stopping a rotating shaft or connecting two shafts having an initial differential speed, involves the dissipation of the friction heat generated in the stopping or connecting process. Conventional clutches and brakes employ multiple disc devices for this purpose, half of the discs being attached to the input shaft and half to the output. Pairs of discs are assembled alternately, one being a plain steel disc having smooth surfaces, and the other having a friction material (such as sintered bronze or paper) bonded to each side. These friction surfaces are grooved in varous ways to facilitate oil circulation, the breaking up of the contact surface into small areas incapable of sustaining thrust load, and providing cutting edges to penetrate the oil film quickly.

There are two basic problems with cooling clutches and brakes. Because oil is normally supplied to the inside radius of the discs to then flow outward, it is impossible to cool the contacting surfaces uniformly, because the amount of oil passing through the disc is fixed by the area of the oil passages at the inner radius, while the contact area itself is increasing by the square of the radius as one proceeds outward.

When normal failure occurs it is usually the steel disc that succumbs first, because intense heat is being applied to both sides, whereas the friction disc has the benefit of more intimate oil contact on both sides (groove wall area) with either a heat insulator (paper) or a better heat conductor (sintered bronze) protecting the steel core.

The patents referred to above discuss the problems of disc failure and suggest the use of perforated discs with oil circulating axially, from end to end.

Whatever design technique is used, it is desirable that: (1) the individual contact areas between the discs should be small (about 0.003–0.005 in$^2$), uniform and numerous; (2) the oil-wetter perimeters of the individual contact surface areas should be maximized (for example, about 60–70 in/in$^2$); (3) the ratio of oil supply to contact area should be uniform over the entire disc surface; (4) the cooling capacity should be essentially the same for both friction and steel discs.

GENERAL DESCRIPTION OF THE DRAWINGS

DETAILED DESCRIPTION OF THE DRAWINGS

Figure 1:
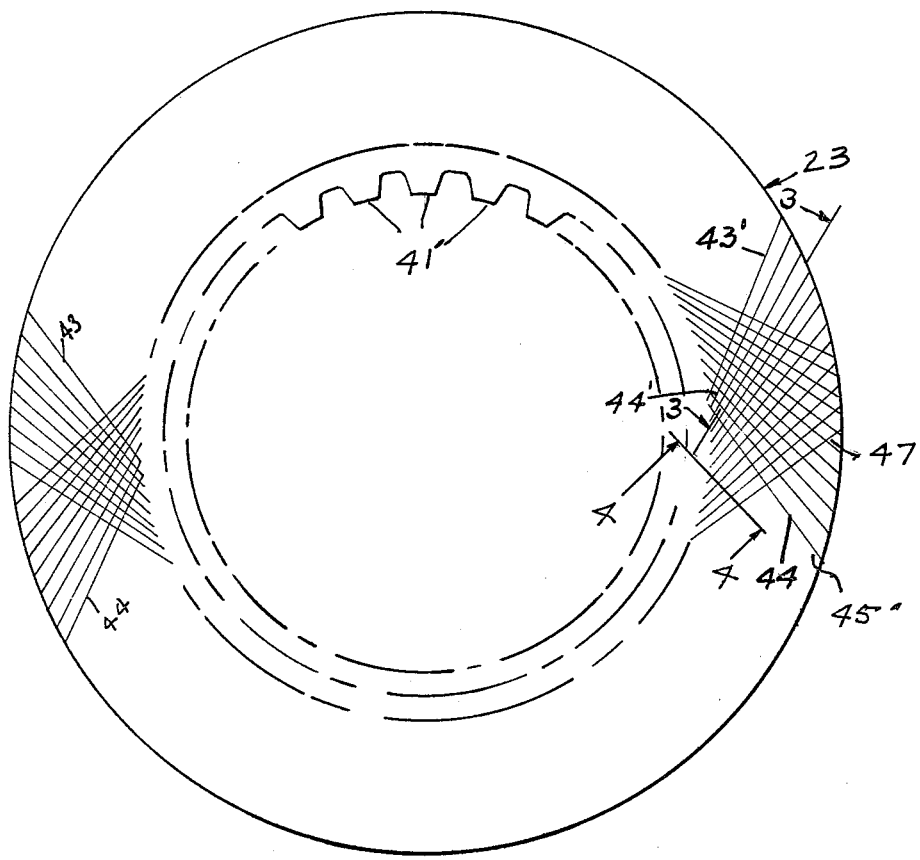
FIG. 1 is a side view of a clutch plate according to the invention.
Figure 2:
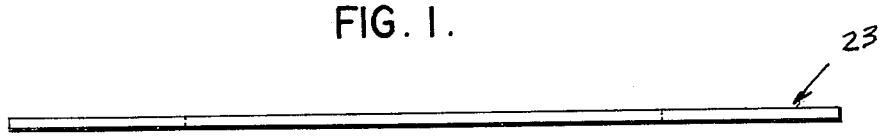
FIG. 2 is an edge view of the clutch plate shown in FIG. 1.
Figure 3:
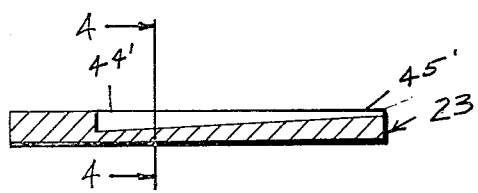
FIG. 3 is a cross-sectional view taken on Line 3—3 of FIG. 1 omitting grooves 44.
Figure 4:
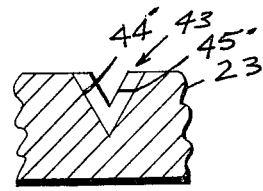
FIG. 4 is a partial cross-sectional view taken on Line 4—4 of FIG. 1.
Figure 1A:
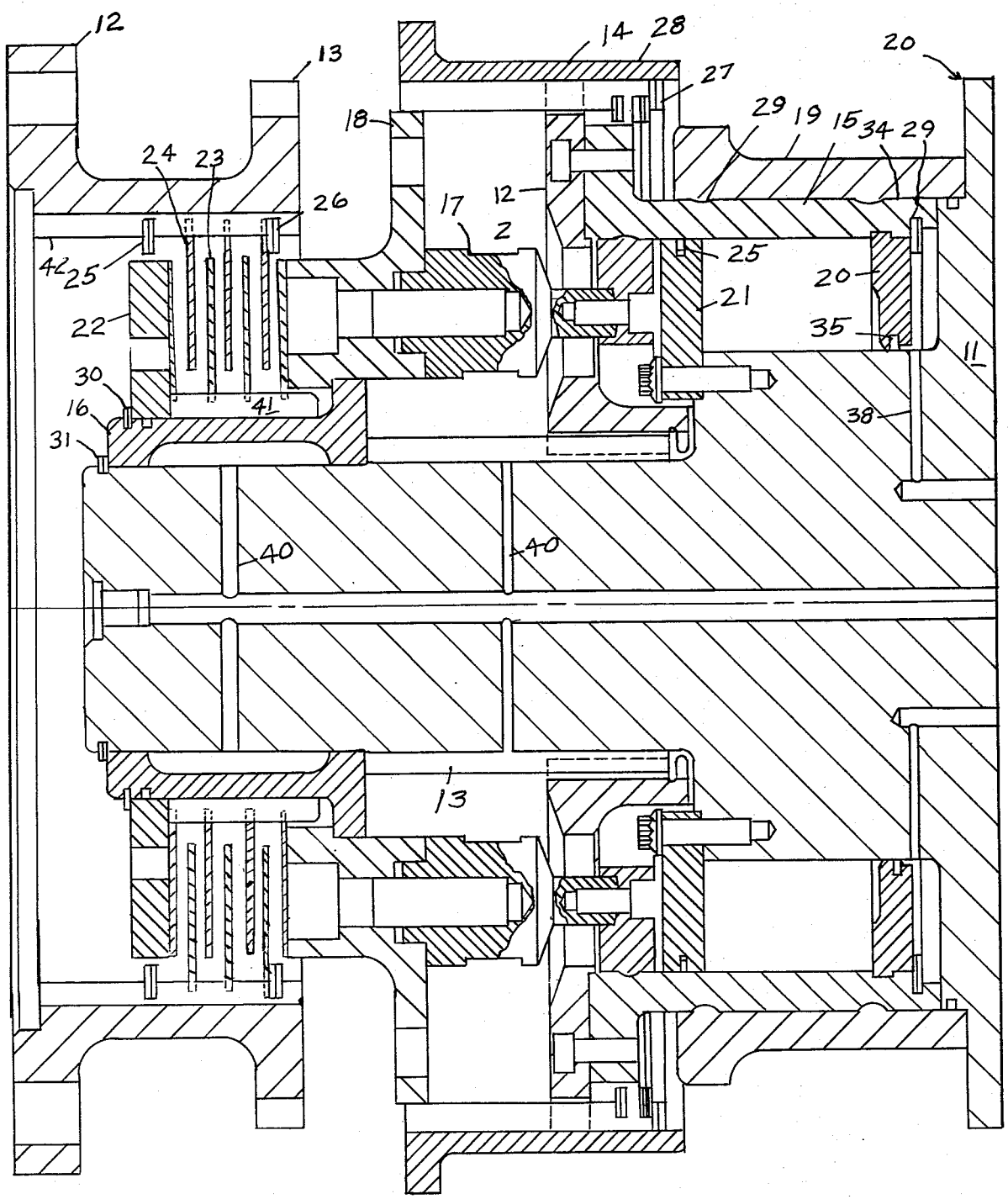
FIG. 1A is a longitudinal cross-sectional view of a synchronizing clutch having clutch plates shown in disengaged position according to the invention.
Figure 1B:
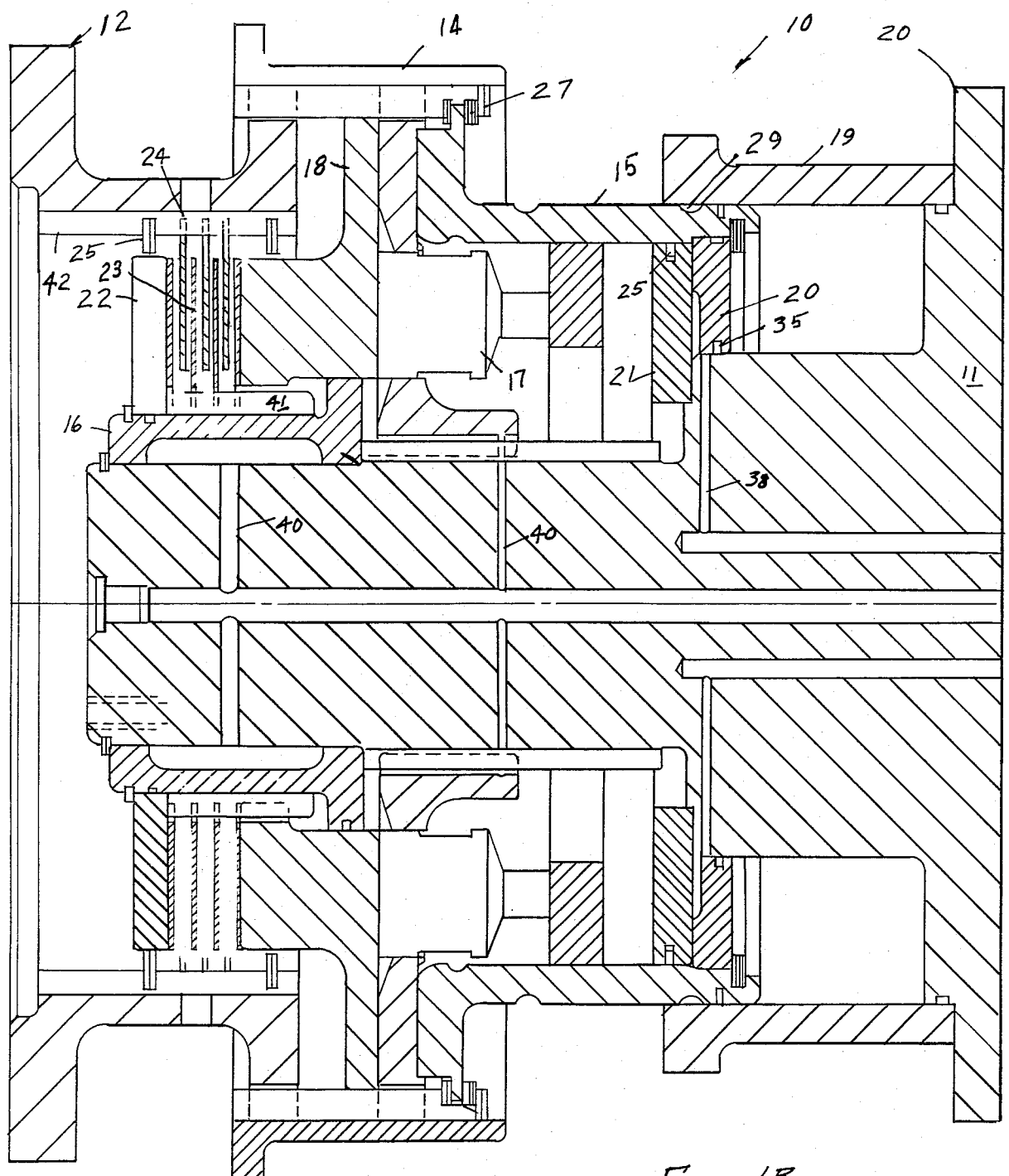
FIG. 1B is a view of the clutch shown in FIG. 1A with discs in engaged position.
Figure 5:
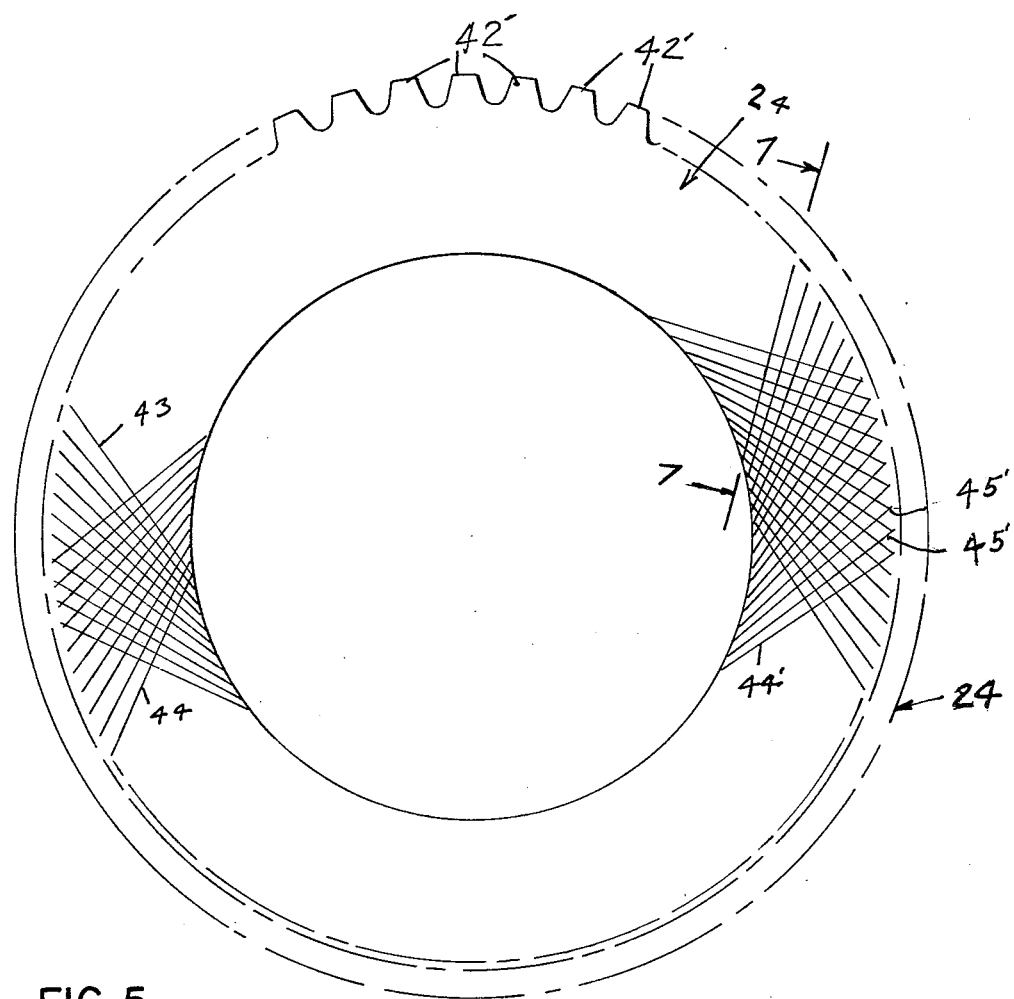
FIG. 5 is a side view of a clutch plate similar to FIG. 1, having teeth on the exterior instead of on the interior.

Now, with more particular reference to the drawings, the clutch shown in FIGS. 1A and 1B in which the plates, according to the invention, are shown by way of example, equipped with drive disc 23 and driven disc 24 according to the invention. The clutch is a familiar type of synchronizing clutch having a power shaft 11, power hub 12 and load end hub 13. Synchronizing pin 17 is moved by piston 20 and it engages pressure ring 18 which is attached to the piston sleeve 15, which slides in cylinder 19. The piston stop 21 limits the movement of the piston 20.

Drive discs 23 are supported on teeth 41 on the drive disc carrier 16 and the driven discs 24 are supported on teeth 42 on the load end hub 13. Discs 23 and 24 are forced together in frictional engagement with each other against the pressure plate 22 by pressure ring 18 which is forced by synchronizing pin 17 which is in turn moved by piston 20 and sleeve 15.

The function of retaining rings 25, 26, 27, 28, 29 30 and 31 and piston rings 32, 33, 34, and 35 and gasket 36 will be apparent to those skilled in the art.

Oil grooves 43 and 44 are formed in one side of both discs 23 and 24. These grooves are deeper at their inner ends 44' than at their outer ends 45' so that they tend to restrict the flow of oil throughout their length from the inner end 44' to their outer end 45'. The discs 23 have inner teeth that mesh with drive teeth 41 and discs 24 have outer teeth 42' that mesh with driven teeth 42. It will be noted that the grooves 43 and grooves 44 are disposed at an angle approximately 90° to each other and are disposed at approximately 45° to the radius of the disc.

Figure 6:
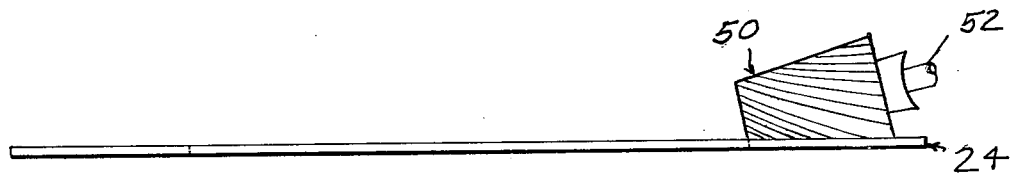
FIG. 6 is an edge view of the clutch plate shown in FIG. 5 showing a knurling tool in position for forming grooves in the plate according to the invention.
Figure 7:
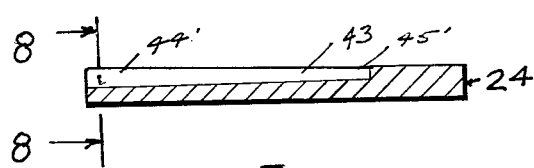
FIG. 7 is a cross-sectional view taken on Line 7—7 of FIG. 5 omitting grooves 44.
Figure 8:
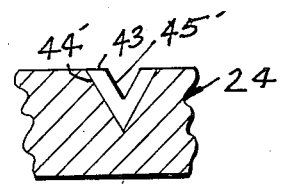
FIG. 8 is a partial cross-sectional view taken on Line 8—8 of FIG. 7.

The grooves may be formed by a knurling tool 50 indicated in FIG. 6. This tool may be frusto-conical in shape and have teeth on its outer periphery in the form of helixes. The design of these discs provides the contact areas between the grooves to be relatively small and the oil-wetted perimeters of the individual contact areas are maximized and the ratio of oil supplied on the contact area is uniform over the entire disc surface.

The knurling tool 50 may be in the general configuration of a helical gear so that when pressure is applied to it and it is rolled over the disc surface in one direction, it indents the metal and forms one set of grooves, and when the axis of the knurling tool is moved to a position 90° to the first position and the tool again rolled over the disc surface, it forms another set of said grooves. The small diameter of the knurling tool is proportionate to the large diameter by a ratio equal to the ratio of the outer diameter of the disc to the inner diameter. While oil is referred to as the cooling medium, any suitable fluid could be substituted for oil.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of manufacturing a clutch plate disc having a center hole comprising, providing a knurling tool that is generally frusto conical in shape having teeth running from the small end thereof towards the larger end thereof, exerting a pressure between said knurling tool and said disc and rolling said knurling tool over at least the entire surface of one side of said disc whereby grooves are formed in said disc from the center hole to the outer periphery thereof.

2. The method recited in claim 1 wherein said teeth on said knurling tool are in the form of helixes and said knurling tool is rolled over said disc in a first direction and then reversed and rolled over said disc in the second direction with the axis of said knurling tool when rolled in said first direction being disposed at an angle of approximately 90° to the direction when rolled in said second direction of the axis, whereby grooves are formed in said plates at approximately 90° to each other.

3. The method recited in claim 1, further comprising forming a clutch assembly by providing a plurality of said plates, and assembling in a clutch with the knurling surface of said plates desposed in contact with the plate adjacent thereto.

* * * * *